(12) United States Patent
Douma

(10) Patent No.: US 11,246,189 B2
(45) Date of Patent: Feb. 8, 2022

(54) VEHICULAR WINDOW ASSEMBLY WITH MAGNETIC CONNECTOR

(71) Applicant: Magna Mirrors of America, Inc., Holland, MI (US)

(72) Inventor: David G. Douma, West Olive, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 448 days.

(21) Appl. No.: 16/411,169

(22) Filed: May 14, 2019

(65) Prior Publication Data

US 2019/0357316 A1 Nov. 21, 2019

Related U.S. Application Data

(60) Provisional application No. 62/674,058, filed on May 21, 2018.

(51) Int. Cl.
  *H05B 3/84* (2006.01)
  *B60J 1/18* (2006.01)
  *B60J 1/00* (2006.01)

(52) U.S. Cl.
  CPC ............... *H05B 3/84* (2013.01); *B60J 1/002* (2013.01); *B60J 1/1846* (2013.01)

(58) Field of Classification Search
  CPC . H05B 3/84; H05B 3/86; H05B 3/845; H05B 3/16; H05B 3/18; H05B 3/06; H05B 2203/011; H05B 2203/031; H05B 2203/016; H05B 2214/02; B60J 1/1846; B60J 1/002; B60J 1/1853; B60J 1/20; B60Q 1/268; B60Q 1/44; B60Q 1/302; B60R 16/0231; B60H 1/00985
  See application file for complete search history.

(56) References Cited

U.S. PATENT DOCUMENTS

| 3,253,786 A * | 5/1966 | Parmelee ................. B60S 1/48 239/284.1 |
|---|---|---|
| 4,920,698 A | 5/1990 | Friese et al. |
| 4,995,195 A | 2/1991 | Olberding et al. |
| 5,146,712 A | 9/1992 | Hlavaty |
| 5,531,046 A | 7/1996 | Kollar et al. |
| 5,572,376 A | 11/1996 | Pace |
| 5,853,895 A | 12/1998 | Lewno |
| 6,068,719 A | 5/2000 | Lewno |
| 6,119,401 A | 9/2000 | Lin et al. |
| 6,319,344 B1 | 11/2001 | Lewno |
| 6,691,464 B2 | 2/2004 | Nestell et al. |
| 6,846,039 B2 | 1/2005 | Lewno |
| 6,955,009 B2 | 10/2005 | Rasmussen |
| 7,003,916 B2 | 2/2006 | Nestell et al. |
| 7,073,293 B2 | 7/2006 | Galer |
| 7,332,225 B2 | 2/2008 | Lewno |

(Continued)

*Primary Examiner* — Shawntina T Fuqua
(74) *Attorney, Agent, or Firm* — Honigman LLP

(57) ABSTRACT

A window assembly for a vehicle includes a window panel having an electrically conductive element disposed thereat. An electrical connector is attached at the window panel and is electrically conductively connected to the electrically conductive element. The electrical connector includes a ferromagnetic material. The electrical connector is attached at the window panel via solder, and the electrical connector is held in place via an electromagnet during the soldering process.

20 Claims, 4 Drawing Sheets

(56) References Cited

U.S. PATENT DOCUMENTS

| | | | |
|---|---|---|---|
| 7,379,028 B2* | 5/2008 | Hisaeda | H01Q 1/1271 219/203 |
| 7,838,115 B2 | 11/2010 | Lewno | |
| 8,322,073 B2 | 12/2012 | Lewno | |
| 8,402,695 B2 | 3/2013 | Smith et al. | |
| 2003/0213179 A1 | 11/2003 | Galer | |
| 2004/0020131 A1 | 2/2004 | Galer et al. | |
| 2006/0107600 A1 | 5/2006 | Nestell et al. | |
| 2008/0127563 A1 | 6/2008 | Tooker | |
| 2011/0056140 A1 | 3/2011 | Lewno | |
| 2013/0174488 A1 | 7/2013 | Snider et al. | |
| 2016/0200241 A1 | 7/2016 | Snider | |
| 2018/0079379 A1* | 3/2018 | Snider | H05B 3/03 |
| 2018/0170251 A1 | 6/2018 | Snider | |
| 2018/0227986 A1 | 8/2018 | Snider et al. | |
| 2018/0281697 A1 | 10/2018 | Snider et al. | |
| 2018/0354101 A1 | 12/2018 | Dawdy et al. | |
| 2019/0005755 A1 | 1/2019 | Snider et al. | |
| 2019/0047380 A1 | 2/2019 | Snider | |

* cited by examiner

VEHICULAR WINDOW ASSEMBLY WITH MAGNETIC CONNECTOR

CROSS REFERENCE TO RELATED APPLICATION

The present application claims the filing benefits of U.S. provisional application Ser. No. 62/674,058, filed May 21, 2018, which is hereby incorporated herein by reference in its entirety.

FIELD OF THE INVENTION

The present invention relates to a window assembly for a vehicle and, more particularly, a heated window assembly for a vehicle.

BACKGROUND OF THE INVENTION

It is known to provide a window assembly having a heater grid established at a glass window panel. Electrical connection to the heater grid is provided via an electrical connector soldered to the window panel. When soldering the connector at the window panel, the connector is set at the targeted or attaching location and the solder is heated and melted and cooled to attach the connector.

SUMMARY OF THE INVENTION

The present invention provides a window assembly that provides for defogging or defrosting of the window panel or panels of the window assembly. The window assembly has an electrically conductive element (such as a heater grid or antenna or electrically powered element or the like, such as a light source or the like) disposed at or established at the window panel. An electrical connector comprises a magnetic material, and is held at an attaching region of the window panel via an electromagnet. While the electrical connector is held at the attaching region of the window panel via the electromagnet, the electrical connector is soldered at the attaching region of the window panel to electrically connect the electrical connector with the electrically conductive element at the window panel.

These and other objects, advantages, purposes and features of the present invention will become apparent upon review of the following specification in conjunction with the drawings.

DESCRIPTION OF THE PREFERRED EMBODIMENTS

Figure 1:
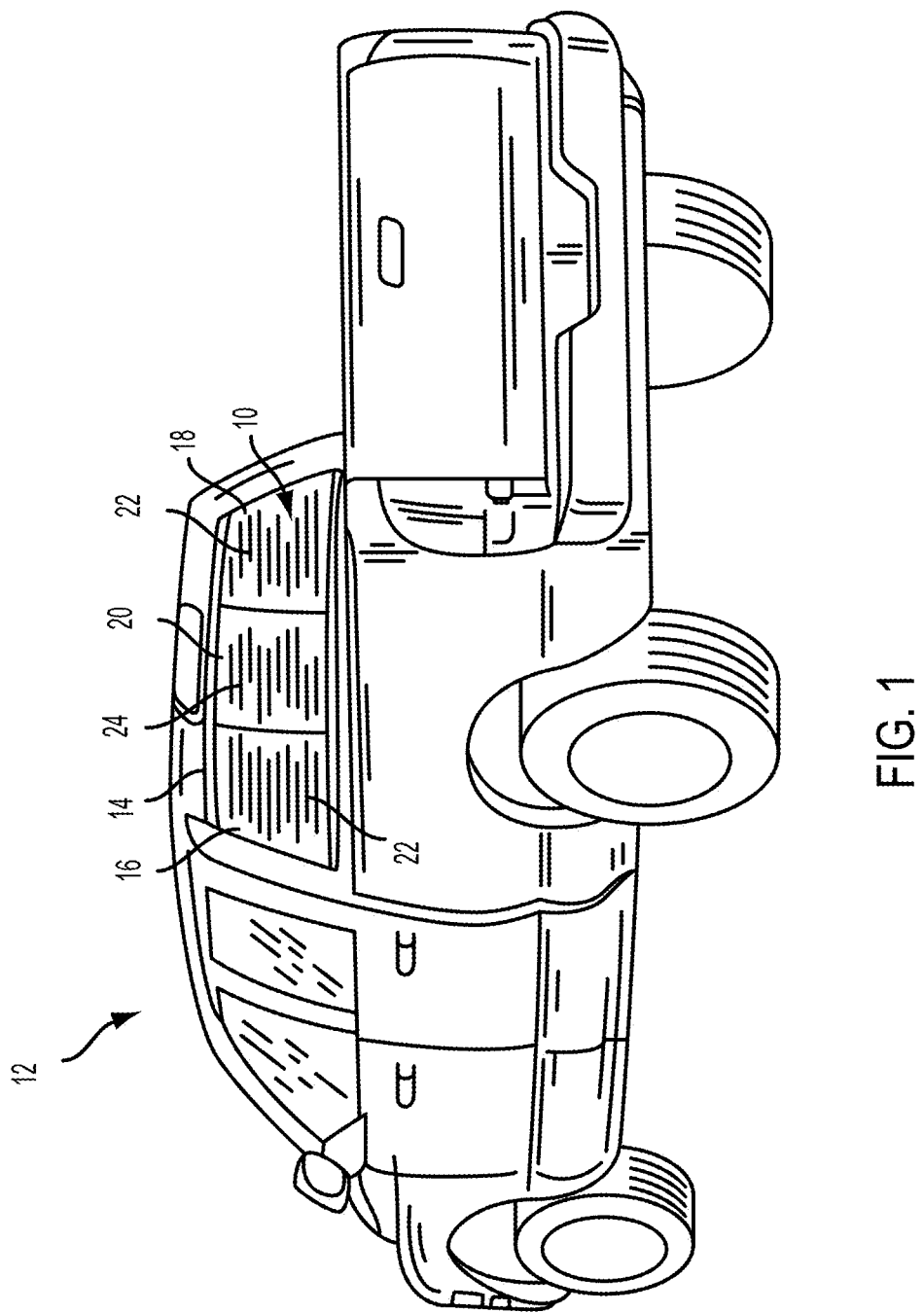
FIG. 1 is a rear perspective view of a pickup truck having a rear slider window assembly in accordance with the present invention.
Figure 2:
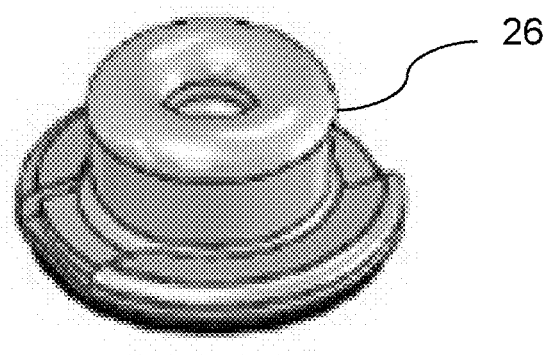
FIG. 2 is a perspective view of an electrical connector that may be magnetized in accordance with the present invention.
Figure 4A:
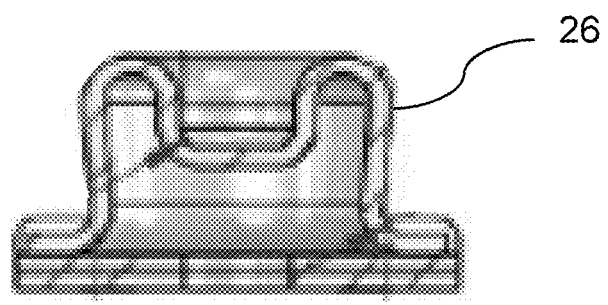
FIG. 4A is a sectional view of the electrical connector, taken along the line A-A in FIG. 4.
Figure 3:
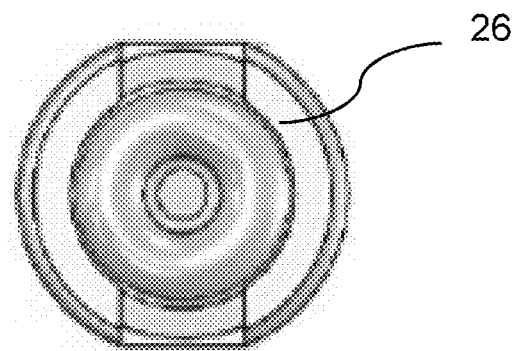
FIG. 3 is a top plan view of the electrical connector of FIG. 2.
Figure 4:
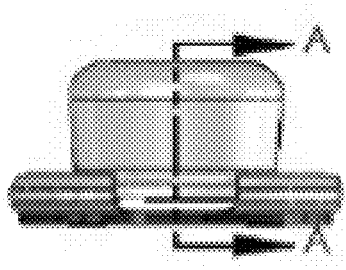
FIG. 4 is a side elevation of the electrical connector of FIG. 2.
Figure 5:
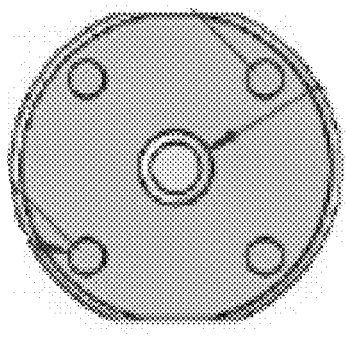
FIG. 5 is a bottom plan view of the electrical connector of FIG. 2.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position (FIGS. 1 and 2). Fixed window panels 16, 18 each include an electrically conductive heater grid 22 or other heating element or electrically operable element established on a surface of the window panels (such as at or on an interior surface of the window panels) and movable window panel 20 includes an electrically conductive heater grid or other heating element or electrically operable element 24 established on a surface of the window panel (such as at or on an interior surface of the movable window panel). The heater grids 22 are electrically conductively connected to (or are otherwise in electrical conductive continuity with) a power source of the vehicle and may be powered (such as responsive to a user actuatable input or switch or button of the vehicle) to heat or defrost or defog the fixed window panels 16, 18. Heater grid 24 is electrically connected to the power source (and may be electrically connected to electrical terminals or elements at one of the heater grids 22 of the fixed window panels) and may be electrically powered to heat or defrost or defog the movable window panel 20. Heater grid 24 of movable window panel 20 is powered in a manner that allows for heating or defogging or defrosting of the movable window panel irrespective of whether the movable window panel is opened or partially opened or closed, as discussed below.

The electrical connection to a wire harness of the vehicle may be made via a terminal 26 (FIGS. 2-5) soldered at one or more of the window panels, such as a button shaped connector or other male/female terminal connector. In the illustrated embodiment of FIGS. 2-5, the connector 26 comprises a button-shaped connector that is soldered to the window panel, whereby an electrical connector of the window assembly or of the vehicle readily snaps onto the connector to make electrical connection with the button connector and the electrically conductive trace or busbar at which it is soldered.

The button connector may have either a lead free solder or leaded solder. The button is a stamped shape (see FIGS. 2-5) that has two metallic elements that are mated together to form the final product. The base has a solder paste and flux applied to one side which is reflowed to attach the component at the window panel, and the upper or button portion attaches at the base and forms the shape that connects with or that is received in the electrical connector.

Figure 6:
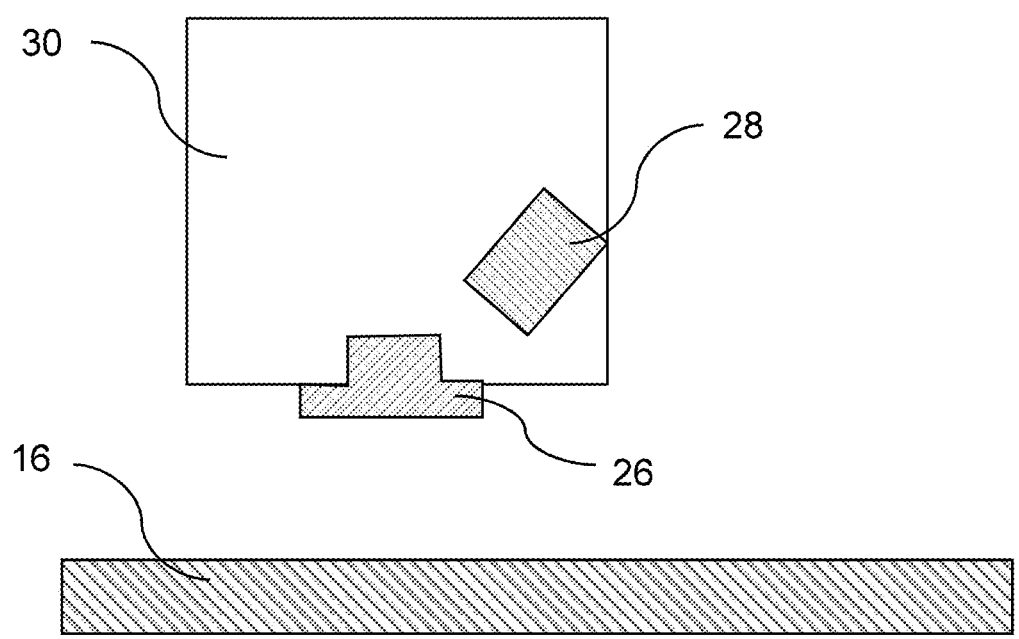
FIG. 6 is a schematic showing the magnet and connector at a positioning tool for placing the connector at the glass window panel.

The upper or button portion comprises a ferromagnetic element that allows the button to be magnetic so that one or more electromagnets 28 (FIG. 6) can be used to hold the buttons in their nest instead of gravity or friction fit. Thus, during the soldering or attaching process, the connector 26 is placed at the attaching location or region of the placing tool 30 and held there via an electromagnet while the solder is heated and then cooled. The electromagnet 28 can hold the connector more firmly than simply relying on gravity, such that the connector can be precisely located and held during the soldering process.

The ferromagnetic material may be a portion of an alloy (such as embedded material or the like) for the top stamping or button shape or the entire sheet (from which the button shape is stamped) may comprise the ferromagnetic material. The electromagnet may be disposed near the button at the side of the window at which the button is to be attached, or the electromagnet may be disposed at the opposite side of the window and draw the button toward the window at the desired location.

Use of such an electromagnet and magnetic button connector assists in holding the button in place during the soldering process. Although shown and described as a button shaped magnetic connector, the magnetic connector may comprise any suitable electrical connector, such as spade type connector or the like, which is configured to be attached at the window panel via soldering. The electrical connector may be for providing electrical connection for a heater grid of the window assembly or for other electrically powered elements or components, such as a light or a camera or a display or the like that is/are disposed at or integrated at the window panel of the window assembly (such as by utilizing aspects of the window assemblies and systems described in U.S. Publication Nos. US-2019-0047380; US-2019-0005755; US-2018-0281697; US-2018-0227986; US-2018-0170251; US-2018-0079379 and/or US-2016-0200241, which are hereby incorporated herein by reference in their entireties).

Although shown and described as having a heater grid and providing electrical power or current to the heater grid to heat or defog or defrost the movable window panel of the rear slider window assembly, it is envisioned that electrical power/current may be provided to the movable window panel (when the movable window panel is closed and at least partially opened) for other functions or purposes. For example, electrical power or electrical current or electrically conductive connections may be provided to the movable glass window panel for connecting to a radio antenna established at the movable window panel and/or carrier of the movable window panel (such as for receiving radio antenna signals or the like), or for powering/controlling lights and/or sensors (such as imaging sensors or photosensors or security/motion sensors or the like) established at the movable window panel and/or carrier or frame of the movable window panel, or for powering/controlling an electrical auto-dimming/shading glass panel (such as an electro-optic or electrochromic glass panel or the like) to provide a dimming/shading feature to the movable glass window panel, and/or the like. The electrical connections or electrically conductive connections to the movable window panel allow for provision of electrical power/current to the accessories or features or content of the movable window panel or at the movable window panel and/or may provide a data/signal transmitting/receiving function for the accessories or features or content of or at the movable window panel, with the connections providing such power/current/transmission/communication irrespective of the position of the movable window panel between its fully closed position and its fully opened position.

In the illustrated embodiment, the window assembly includes two fixed window panels that are spaced apart so as to define an opening therebetween. The slider or movable window panel is movable along a lower rail and an upper rail of frame portion to open and close the opening, such as in a manner similar to known slider window assemblies. Optionally, the slider window panel may be disposed at a lower carrier that receives the lower perimeter edge region of the slider window panel therein and that is slidably or movably received in the lower rail of frame portion.

The movable or slider window panel is movable such as via manual pushing or pulling at the window panel or in response to actuation of a drive motor of a drive motor assembly or system, which may move cables or the like to impart horizontal movement of the slider window panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. 2004/0020131 and/or 2008/0127563, which are all hereby incorporated herein by reference in their entireties.

Although shown and described as being a rear slider window assembly, the window assembly at which the magnetic connector is attached may comprise any vehicle window assembly, such as a rear liftgate or the like, where electrical connection is made to electrically conductive traces or electrical elements at the window panel.

Optionally, the window assembly or assemblies of the present invention may utilize aspects of the window assemblies described in U.S. Pat. Nos. 8,402,695; 8,322,073; 7,838,115; 7,332,225; 7,073,293; 7,003,916; 6,691,464; 6,846,039; 6,319,344; 6,068,719 and/or 5,853,895, and/or U.S. Publication Nos. 2013/0174488; US-2011-0056140; 2006/0107600; 2008/0127563; 2004/0020131 and/or 2003/0213179, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A method for assembling a vehicular window assembly, said method comprising:
providing a window panel;
disposing an electrically conductive element at the window panel;
providing an electrical connector, wherein the electrical connector comprises a magnetic material;
holding the electrical connector at an attaching region of the window panel via an electromagnet; and
while the electrical connector is held at the attaching region of the window panel via the electromagnet, soldering the electrical connector at the attaching region of the window panel to electrically connect the electrical connector with the electrically conductive element at the window panel.

2. The method of claim 1, wherein the electrically conductive element comprises a heater grid.

3. The method of claim 1, wherein the electrically conductive element comprises an electrically conductive trace established at a surface of the window panel and in electrically conductive connection to an electrically powered accessory of the vehicular window assembly.

4. The method of claim 1, wherein the electromagnet is disposed at the same side of the window panel at which the electrical connector is disposed.

5. The method of claim 4, wherein the electromagnet is disposed at a placing tool that holds the electrical connector.

6. The method of claim 5, comprising moving the electrical connector to the window panel via the placing tool.

7. The method of claim 1, wherein the electromagnet is disposed at the opposite side of the window panel from which the electrical connector is disposed.

8. The method of claim 1, wherein the electrical connector comprises a button-shaped connector.

9. The method of claim 8, wherein the button-shaped connector has a base with solder disposed thereat and a button portion that comprises the magnetic material.

10. The method of claim 1, wherein the electrical connector comprises a spade connector.

11. The method of claim 1, wherein the window panel comprises a glass window panel.

12. A system for assembling a vehicular window assembly, said system comprising:
a window panel support configured to support a window panel;
a placing tool for placing an at least partially magnetic electrical connector at a window panel supported by the window panel support;
wherein the placing tool comprises a receiving portion for partially receiving the electrical connector;
an electromagnet;
a soldering device that solders the electrical connector at the window panel;
wherein, with the electrical connector placed at the window panel by the placing tool, the electromagnet functions to hold the electrical connector in place during the soldering process to attach the electrical connector at the window panel; and
wherein the electrical connector is, when attached at the window panel, electrically conductively connected to an electrically conductive element at the window panel.

13. The system of claim 12, wherein the electrically conductive element comprises a heater grid.

14. The system of claim 12, wherein the electrically conductive element comprises an electrically conductive trace established at a surface of the window panel and in electrically conductive connection to an electrically powered accessory of the vehicular window assembly.

15. The system of claim 12, wherein the electromagnet is disposed at the same side of the window panel at which the electrical connector is attached.

16. The system of claim 15, wherein the electromagnet is disposed at the placing tool that supports the electrical connector and moves the electrical connector to the window panel.

17. The system of claim 12, wherein the electromagnet is disposed at the opposite side of the window panel from which the electrical connector is disposed.

18. The system of claim 12, wherein the electrical connector comprises a button-shaped connector.

19. The system of claim 12, wherein the electrical connector comprises a spade connector.

20. The system of claim 12, wherein the window panel comprises a glass window panel.

* * * * *